United States Patent [19]

Baran et al.

[11] Patent Number: 4,771,425
[45] Date of Patent: Sep. 13, 1988

[54] SYNCHORONOUS PACKET VOICE/DATA COMMUNICATION SYSTEM

[75] Inventors: Paul Baran, Menlo Park; Charles M. Corbalis, San Jose; Brian D. Holden, Half Moon Bay; Jon K. Masatsugu; Lewis J. Marggraff, both of Mountain View; David P. Owen, Palo Alto; Peter W. J. Stonebridge, San Jose, all of Calif.

[73] Assignee: StrataCom, Inc., Campbell, Calif.

[21] Appl. No.: 665,819

[22] Filed: Oct. 29, 1984

[51] Int. Cl.[4] .......................... H04J 3/02; H04J 3/12; H04J 15/00
[52] U.S. Cl. ........................................ 370/85; 370/94; 370/110.1; 370/118
[58] Field of Search ...................... 370/60, 94, 85, 118, 370/110.1; 340/825.5

[56] References Cited

U.S. PATENT DOCUMENTS

| | | | |
|---|---|---|---|
| 4,154,983 | 5/1979 | Pedersen | 370/86 |
| 4,156,112 | 5/1979 | Moreland | 370/85 |
| 4,237,553 | 12/1980 | Larsen | 370/89 |
| 4,301,532 | 11/1981 | Janetsky | 370/85 |
| 4,373,183 | 2/1983 | Means et al. | 340/825.5 |
| 4,491,945 | 1/1985 | Turner | 370/60 |
| 4,494,230 | 1/1985 | Turner | 370/60 |
| 4,521,882 | 6/1985 | Gabrielli et al. | 370/94 |
| 4,534,024 | 8/1985 | Maxemchuk et al. | 370/60 |
| 4,534,025 | 8/1985 | Floyd | 370/94 |
| 4,535,448 | 8/1985 | Baxter et al. | 370/85 |
| 4,536,875 | 8/1985 | Kume et al. | 370/94 |
| 4,550,402 | 10/1985 | Gable et al. | 370/85 |
| 4,586,175 | 4/1986 | Bedard et al. | 370/94 |

OTHER PUBLICATIONS

Turner, "Design of an Integrated Services Packet Network," Washington University, WUCS-85-3 (Mar. 1985) pp. 1–22.
Montgomery, "Techniques for Packet Voice Synchronization," IEEE Journal on Selected Areas of Communications, vol. SAC-1, Dec. 1983, pp. 1022–1028.
Hoberecht, "A Layered Network Protocol for Packet Voice and Data Integration," *IEEE Journal on Selected Areas of Communications,* vol. SAC-1, Dec. 1983, pp. 1006–1013.
Corbalis, "The Challenge of Voice by the Packet," Technical Note, *Telecommunications,* Oct. 1986, pp. 47–54.

*Primary Examiner*—Douglas W. Olms
*Assistant Examiner*—Frank M. Scutch, III
*Attorney, Agent, or Firm*—Townsend and Townsend

[57] ABSTRACT

A packet communications network and apparatus for communicating information in voice and data packets transmits and receives voice and data in accordance with standardized frames of a standardized communications format such as a standard DS-1 type trunk. An apparatus is coupled to multiplex standardized channels into a single channel wherein voice or data signals are packetized into independently addressable packets synchronized on, for example, the DS-1 frame. The network includes voice and packet data concentration apparatus operable in a multiple node trunk environment to concentrate signals into independently addressable synchronously switchable packets, thereby to provide an efficient (high data capacity) interface between trunk terminations. Up to four times as much information can be transferred between nodes with the ability to switch between nodes as compared to conventional TDM and PCM communication without compression without the ability to switch between nodes.

6 Claims, 8 Drawing Sheets

SYNCHORONOUS PACKET VOICE/DATA COMMUNICATION SYSTEM

BACKGROUND OF THE INVENTION

1. Field of the Invention

This invention relates to digital voice communication and in particular to packet switched digital voice and data communication. More particularly, the invention relates to packet switched digital voice and data communication over a network capable of handling high data rates, including media such as digital trunks used in the telephone network or coaxial cable as used in cable television networks.

2. Description of the Prior Art

Packet communication is known in general. However, known packet switching techniques typically involve variable and arbitrary delay in a store and forward environment. These delays are unacceptable for two-way communication involving real-time voice signals. The human ear is critically sensitive to absolute delay greater than about 200 ms. The ear is also critically sensitive to random delays or gap modulation.

Bell-Northern Research has developed a digital concentrator system under the designation PLC-1 to connect two distant points of a private network over a telephone trunk. An article by Black et al., "PLC-1: Digital Technology Cuts Cost of Analog Trunking," *Telesis* 1982 *Three* pages 2–8 describes digital speech interpolation in which systems allocate signal transmission according to loading rules. Digital speech interpolation (DSI) techniques employ digital signal processing techniques and the statistics of speech for detecting signal load and for adjusting to channel capacity. In the PLC-1 system, one load is handled by temporarily storing speech bursts until the momentary overload disappears. Such a technique may result in delays of more than 300 ms (⅓ sec) in about 10% of the occurrences of overload. Up to twice normal channel capacity may be achieved.

Aydin Monitor Systems of Fort Washington, Pa. offers a T-1 channel voice data multiplexer capable of multiplexing 48 voice channels into a single T-1 channel normally designed to handle 24 voice channels. The Aydin system employs a variable quantizing level (VQL) technique which allows two to one voice compression to increase the effective channel capacity of the channel with subjectively minimal degradation of voice quality. A data sheet dated July 1982 describes such a channel bank facility.

Aydin Monitor Systems has recently announced a T-1 channel voice/data multiplexer for which it is claimed 72 voice or data channels can be handled over a standard T-1 trunk. The new system is understood to use VQL encoding and digital speech interpolation (DSI) techniques.

The literature of packet voice transmission is extensive and suggests that packet voice transmission is not very cost effective or of high quality. A representative tutorial article on packet voice is "Packet Voice: When It Makes Sense" by Randy Cole in the September/October, 1982 issue of *Speech Technology*. The present invention seeks to overcome the limitations noted in the literature.

Time division multiplexing (TDM) systems are known including the time division multiplexed pulse code modulation systems associated with the T-1 carrier system used in the United States. PCM communication is based on circuit switching in which analog voice signals are converted to digital signals and then interlaced in time slots with other similar signals. In TDM, 24, 30 or even more device signals are interlaced in time and passed through a telephone transmission system at a bit rate of generally 1.544 or 2.048 Mbps. The bit stream occurs as a result of sequentially scanning samples of each of 24 analog to digital converters per each timing frame. Each of the 24 time slots in the frame transmits a separate circuit. In a T1 PCM scheme, it is possible to perform some limited circuit switching by slightly delaying the incoming bit stream to place a frame in a selected time slot. Command signaling which controls the delay may be transmitted in connection with the information bit stream although out of band. With conventional circuit switching techniques, the ratio between the transmission time and the switching period is very long. PCM lends itself both to time division switching and to conventional matrix space division switching. (Time division switching is switching wherein each time slot represents a different path. Space division switching is switching wherein each input path is switched to a separate outgoing path.)

All of the systems hereinabove described relating to conventional telephone systems are channel bank architectures which are operative to convert individual analog telephone voice channels to digital pulse code modulation (PCM) signals on a channel by channel basis. The systems are thus limited to analog/digital conversion with point to point signal direction.

SUMMARY OF THE INVENTION

According to the invention, an apparatus is provided for high capacity voice and data communication in the form of truly independent synchronous packet switched digital packets. A network is defined which formats data into a packet frame which is compatible with standardized TDM trunk formats and yet which is fast enough to permit packet switching of voice packets.

Elements of a system include voice/data packet switches (VDPS) each of which formats information into standardized packets and then switches and sends the packets synchronously with each other according to a standardized synchronous communication format. The system achieves a fixed minimal delay for each packet between the source and destination of each packet. In a preferred embodiment, a VDPS employs a packet format which matches a standard trunk transmission frame format, such as AT&T standard DS-1 at 1.544 Mbps.

Concentration of voice is achieved by detecting silence periods and not sending packets during the normal silence periods noted in a two-way conversation situation. As both speakers rarely talk at the same time, the number of transmitted packets needed may be reduced by 50 percent. The packets used in this system are relatively short. Thus, additional silence periods are found in the normal pauses of speech, which can produce further savings.

In conventional telephone industry practice today, digital speech is sent as 8,000 samples per second, each of 8 bits logarithmic precision, or about 64,000 bits per second Pulse Code Modulation (PCM). In the preferred embodiment the 64,000 bit/second stream is optionally converted to 32,000 bit/second Adaptive Differential Pulse Code Modulation (ADPCM) in accordance with a new industry standard, now adopted as a CCITT draft Recommendation G.7xx.

Conventional packet switching uses adaptive routing which produces an occasional roundabout route with a resulting long time delay. The preferred embodiment of the present invention is best adapted to a hierarchical tree architecture—such as commonly found in cable television systems and in conventional telephone network practice.

Conventional packet switching detects defective packets (usually by failure of a cyclic redundancy check) and causes their repetition. In the preferred embodiment, packets containing voice signals are uniquely identified and not repeated if in error, while packets containing data which are less time sensitive can be repeated.

The preferred embodiment employs as a standard an independently addressable packet having 168 bits of data is embedded in a 193 bit standard DS-1 frame. The delay introduced by packetizing and coding voice according to four-bit ADPCM is $5\frac{1}{4}$ ms.

The VDPS has an architecture in which an internal bus is employed which is synchronized with the external global DS-1 clock and time shares between telephone circuit-type traffic and packet-switched traffic. Packet queuing is used only for contention resolution. Thus, the VDPS units which make up a packet voice network are synchronized to the same global clock. In this way, synchronous packet communication is achieved as opposed to store and forward packet communication.

An advantage of this invention is an ability to switch between modes in a synchronous voice packet communication format.

Other advantages of the invention will be apparent upon reference to the following detailed description taken in connection with the accompanying embodiments.

DESCRIPTION OF SPECIFIC EMBODIMENTS

Figure 1:
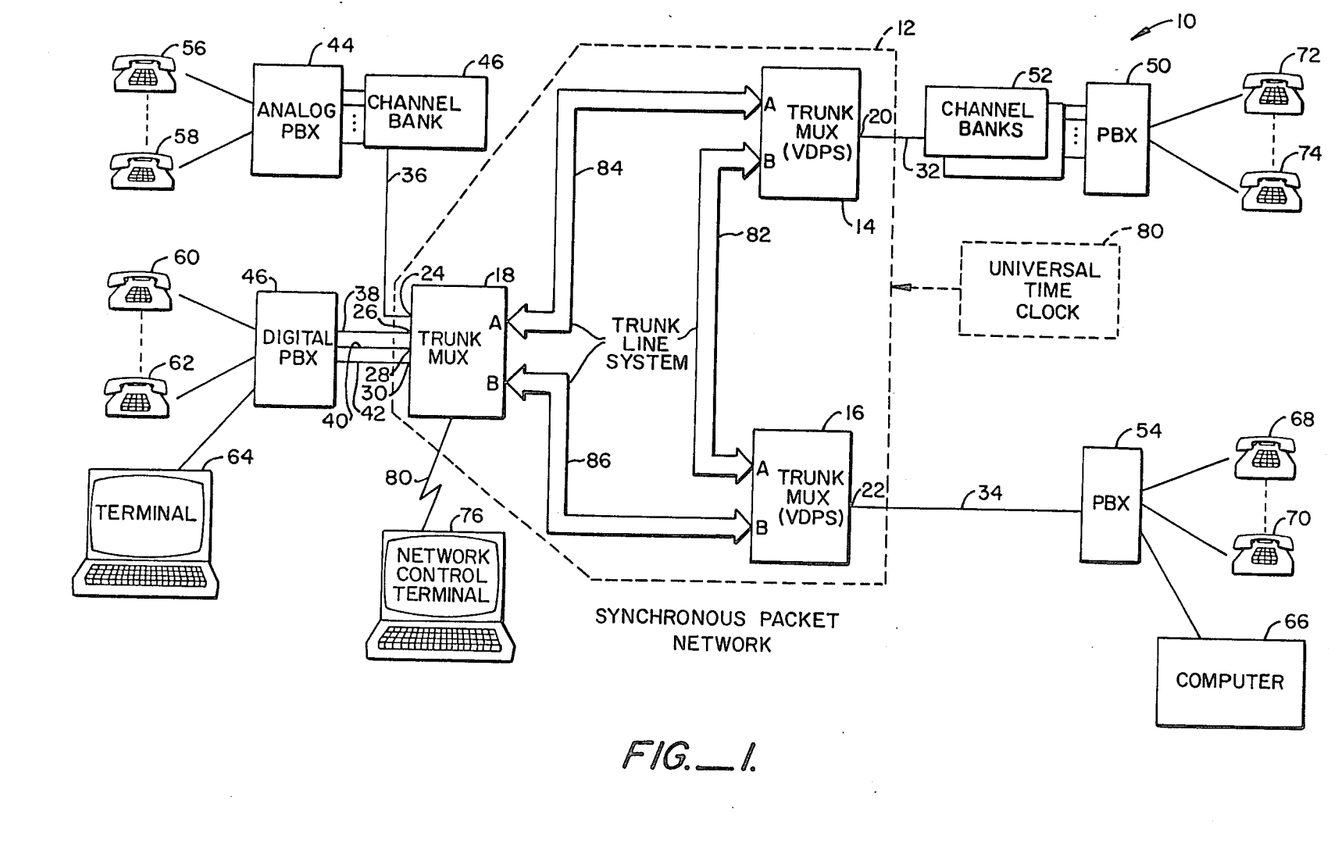
FIG. 1 is a block diagram of a trunk environment employing apparatus in accordance with one aspect of the invention.

Referring to FIG. 1, there is shown a block diagram of a system 10 employing a synchronous packet communications network 12 in accordance with the invention. The synchronous packet communications network 12 comprises a plurality of modular units operative as trunk circuit multiplexers and demultiplexers and hereinafter each referred to as a trunk MUX or voice/data packet switch (VDPS). These terms may be used herein interchangeably. Illustrative are a first trunk MUX 14, a second trunk MUX 16, and a third trunk MUX 18. Each trunk MUX has at least two ports. An external trunk port 20 is associated with trunk MUX 14. An external trunk port 22 is associated with trunk MUX 16, and four external trunk ports 24, 26, 28 and 30 are associated with third trunk MUX 18 (hence it is sometimes referred to as a quad trunk MUX). Each external trunk port is coupled to an external trunk. Illustrated are external trunks 32, 34, 36, 38, 40 and 42. The external trunks route conventional format digital PCM signals from the trunk MUXs to a variety of communication systems having compatible PCM trunk interfaces. An illustrative PBX trunk connection is analog PBX 44 coupled through a DS-1 type channel bank 46 and external trunk 36 to external trunk port 24. Still another illustrative PBX is digital PBX 48 coupled directly to third trunk MUX 18 via external trunk 38 to external trunk port 26. Second trunk MUX 16 is shown coupled from external trunk port 22 via external trunk 34 to PBX 54. The various PBX and channel bank configurations are merely representative of possibilities for interface with ports external of the network 12.

A variety of telephone tasks may be supported. An analog PBX, such as the analog PBX 44, may switch, receive and transmit conventional analog telephone signals among conventional analog telephone sets 56 and 58 to channel bank 46, as an example. A digital PBX, such as PBX 46, may switch, transmit and receive voice signals through digital telephones 60 and 62, along with digital data signals of a data terminal 64. The terminal 64 may be remote from its computer 66. The computer 66 may be connected to a digital PBX, such as PBX 54, in the same manner as a terminal 64. Digital telephones 68 and 70 may also be connected to digital PBX 54 as digital telephone 60 and 62 are connected to the PBX 46 and then to a trunk MUX 18. Digital telephones 72 and 74 may be connected through a digital PBX 50, which in turn is connected to channel banks 52 to a trunk MUX 14. The variety and versatility of the interconnections with this invention is made possible by a combination of a unique packet format which is transparent to the user in a unique distributed intelligence configuration enhanced by a modular design built around a packet communication oriented bus, as hereinafter explained.

This invention is a remotely configurable, self controlled computer-based packet network which is particularly useful in a DS-1 trunk communications environment. Central control of the synchronous packet network 12 may be provided through a network control terminal 76, which terminal is used to initialize conditions in the network or to change conditions under manual control. Normally, the packet network 12 operates without external intervention. The network control terminal 76 may be connected into the network 12 from a remote location through a separate data communications link 80. It can be connected into the network 12 at any trunk MUX which is provided with a dedicated communications link interface. Any of the trunk MUXs (in the network 12) may be connected to the control terminal 76. Configuration signals are sent out from the control terminal 76 in the packet format of the network.

The synchronous packet network 12 is synchronized to universal time of the universal time clock as commonly used in the telephone industry practice. For this purpose, the synchronous packet network 12 is provided with an input signal from the universal time clock, herein designated universal time clock 80. The universal time clock in the United States is generated by the U.S. National Bureau of Standards for the purpose of providing synchronization worldwide. The clock signal and timing for use in the network 12 may be derived from any frame signal of a received DS-1 telephone trunk signal. For example, a DS-1 carrier 34 provides framing signals to second trunk MUX 16 from which network system timing can be established. Trunk MUX 16 distributed timing throughout the network 12.

Within the synchronous packet network 12 are standard DS-1 trunk line systems which might also consist of point-to-point T-1 cables and PCM transceivers. The trunk lines, such as trunk lines 82, 84 and 86, interconnect the respective trunk MUXs. According to the invention, the trunk MUXs convert the DS-1 trunk line system into a packet-switched system capable of switch support of both data and voice with high bandwidth utilization. Typically, T-1 links used by the telephone industry operate at a rate of 1,544,000 bits per second. In conventional DS-1 communication, these links send 24 PCM channels sampled at 8,000 times per second plus 1 extra framing bit before every 192 bits. The 192 bits are composed of 24 8-bit samples and the entire 193 bits are called a frame. During every 6th frame the sample size is reduced to 7 bits and the extra bit is used to convey signalling information. In the present invention, however, signals are sent as packets, not as conventional DS-1 PCM signals, and appear indistinguishable to the T-1 transmission equipment. It is necessary to avoid certain combinations of bits which would set off normal telephone company T-1 transmission system alarms. Meeting this system constraint is one of the objectives of this invention.

Unlike conventional DS-1 systems, the packet communication system according to the invention provides, at each trunk MUX mode, switchable routing of each time frame of the standard DS-1 frame. Thus packet switching according to the invention provides for essentially transparent packet communication embedded in a DS-1 environment. This is made possible by transforming each frame of the DS-1 standard into one independently addressable communication packet subject to a short incrementally fixed maximum delay. Independently addressable switched packets in a conventional DS-1 environment make possible a density of band utilization previously unknown in a switched telecommunications matrix. By way of an example of switched routing, the terminal 64 may send successive packets of information to the computer 66 through one of two routes. The first route might be via trunk line 86 between trunk MUX 18 and trunk MUX 16. The second route might be via trunk lines 84 and 82 wherein trunk MUX 14 merely passes a packet between trunk lines 84 and 82. Since each packet contains all of the information necessary to route a packet, and since the packets work synchronously with the DS-1 standard, both data as well as voice communication can be supported in a packetized format in essentially real time. The invention can greatly increase the functional bandwidth utilization of a DS-1 environment because unused trunk lines can be utilized on a frame-segmented multiplexing basis. Moreover information compression techniques may be used to compress data to take better advantage of the frequency spectrum of a T-1 cable.

Figure 2:
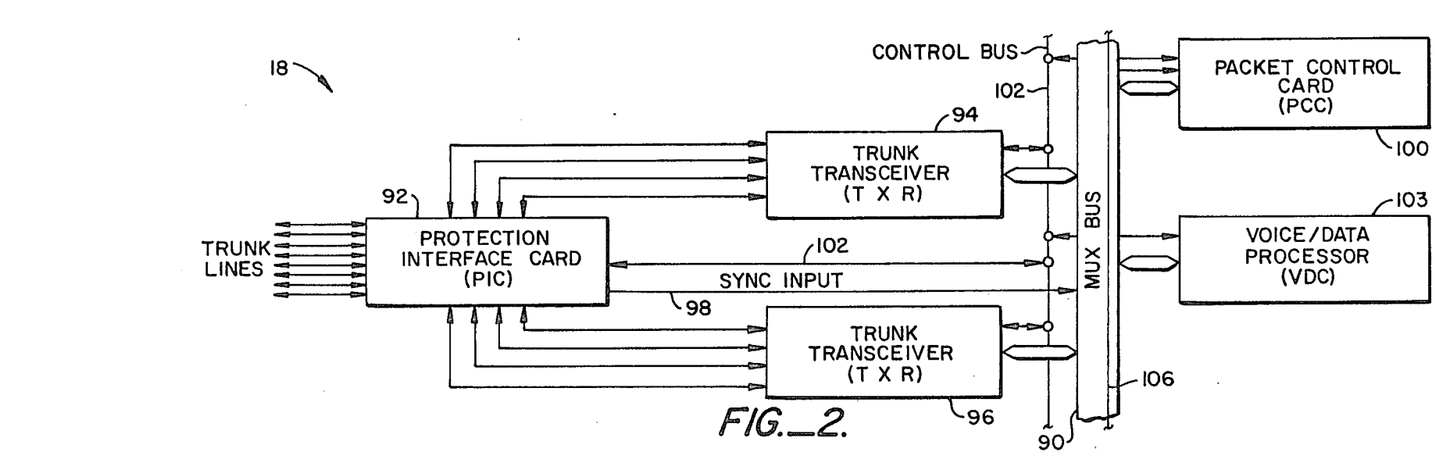
FIG. 2 is a block diagram of a voice/data packet switch (VDPS) in accordance with the invention.

FIG. 2 shows a block diagram of a maximum configuration trunk MUX or voice and data packet switch hereinafter VDPS 18. This is the type of trunk MUX which might be used to interconnect eight line interfaces of a DS-1 signal. The architecture is modularized so that each VDPS can be expanded to satisfy the demands of the specific mode in terms of DS-1 trunk line interfaces, non-DS-1 interfaces and control interfaces. For simplicity only DS-1 interfaces are illustrated. It is modularized around a high speed bus, herein called the MUXBUS 90.

Figure 9:
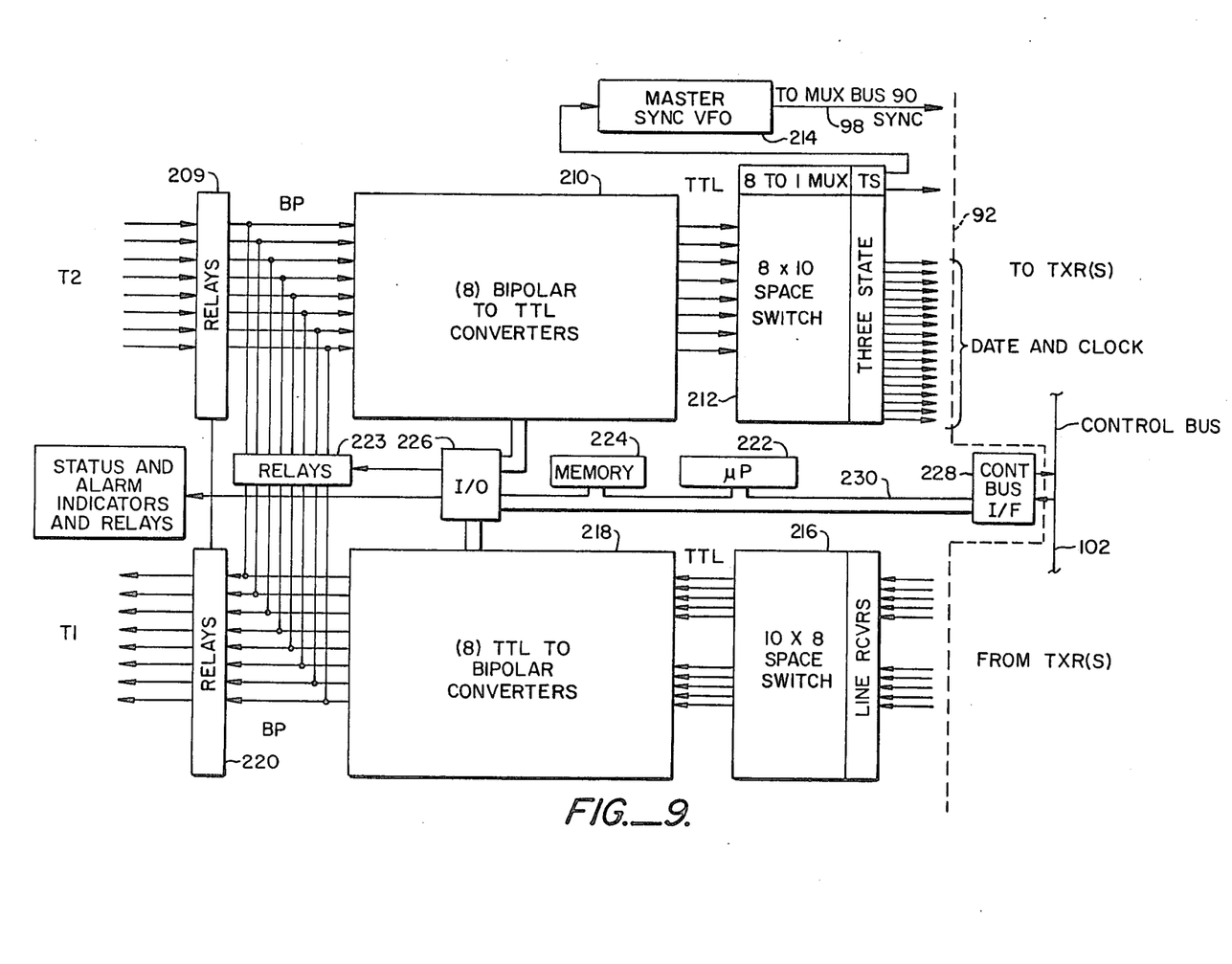
FIG. 9 is a block diagram of a protection and interface card or subsystem for use in a VDPS according to the invention.

The VDPS 18 communicates with the external environment through a protection interface card (PIC) 92 (also FIG. 9). The PIC 92 provides ports for trunk lines routing incoming signals through a first trunk transceiver 94, operative as a receiver, and routing outgoing signals to a second trunk transceiver 96, operative as a transmitter. The PIC 92 is also operative to derive time synchronization. The synchronization signal is provided through a sync input line 98 to an internal control unit, herein called the packet control card (PCC) 100. The PCC 100 establishes time multiplexed packet routing on the MUXBUS 90 between sources and destinations, for example between two ports, between ports and devices in the VDPS 18, or between two devices in the VDPS 18. The PCC 100 also establishes the system configuration for the VDPS 16. The MUXBUS operates as two time-multiplexed buses in two modes, a packet mode and a circuit mode.

The VDPS contains several cards or subsystems each with an independently operable control processing unit (CPU). A control bus 102 may be provided for CPU-to-CPU communication within the VDPS. Other intrasystem housekeeping is via the MUXBUS 90 in its circuit mode.

Each of the cards is connected to the MUXBUS 90 and is identifiable for intercommunication purposes by a numerical address assignment. The PCC 100 controls the assignment of addresses to each card and the allocation of addresses to time slots defined on the MUXBUS 90. A voice/data processor (VDP) 103 is also coupled to the MUXBUS 90. It is operative to compress and decompress voice information in packets for distribution between trunk lines. The VDP 103 is more accurately a packet creator and disassembler. The VCD 103 introduces delay into the system, a delay which is minimmal and finite and which generally does not exceed 13 ms. A time slot qualifier line 106 is a line of the MUXBUS 90. The time slot qualifier line 106 provides the internal synchronization for the VDPS 18 to distinguish between the packet mode and the circuit mode.

Figure 3A:
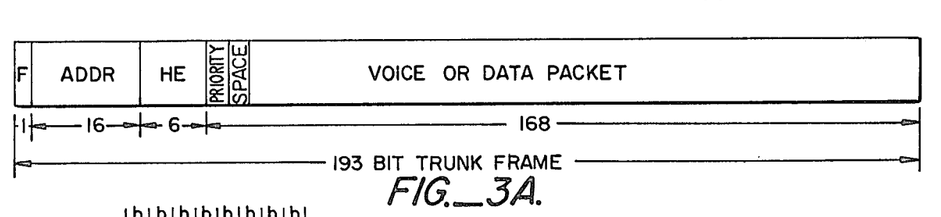
FIG. 3A is a data frame diagram in accordance with a specific embodiment of the invention.
Figure 3B:
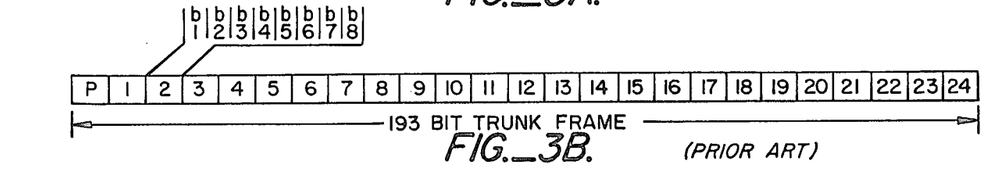
FIG. 3B is a data frame diagram of a standard telephone network PCM frame of 24 serial channels, each carrying an eight-bit sample.

Referring to FIG. 3A, there is shown diagrammatically the structure of a packet on a trunk frame in accordance with the invention, while FIG. 3B shows in distinction the standard T-PCM frame of 24 serial channels each carrying an 8-bit sample. The standard trunk frame for DS-1 as described in the Bell System Compatibility Bulletin Number 119 is 193 PCM bits at a data rate of 1.544 bps, corresponding to a clock rate of 1.544 MHz. In accordance with the invention, the entire frame forms a packet. The first bit is the standard DS-1 Framing Bit, the next 24 bits are set aside for packet overhead functions, and 168 bits are employed to convey voice or data. Specifically, 16 bits of the 24 bits are provided for packet destination address information; 6 bits are provided for a Hamming error correcting code (HE); one bit is for priority and one bit is spare. The information in each packet is directed to a single destination and is independent of the frame to which it is assigned. Because a conventional DS-1 format is employed for the packetized data stream, synchronization of the packets to the transmission bit rate is highly simplified.

In operation, information from an external source such as a trunk is received through the protection interface card 92, queued and transmitted to the MUXBUS 90 during an assigned circuit mode frame of the MUXBUS 90. The frame is then packetized by the VDP 103, queued and reintroduced onto the MUXBUS 90 during an assigned packet mode frame. Each packet is read or ignored by each of the units or cards connected to the MUXBUS 90 as hereinafter explained, based on a time slot allocation of a synchronous bus cycle. The packet contains the destination address. The packet is eventually read by a transceiver which passes the packet to an internal trunk line for distribution through the network 12 (FIG. 1) to the destination designated in its packet address.

The time slot allocation determines destination addressing in the packet mode internal to the VDPS 18. The time slot allocation is made by the PCC 100 following initial configuration of the VDPS 18. Because of static allocation of voice or data packets, a card will automatically recognize whether the contents of the packet is to be interpreted as voice or data-type information.

Information is queued according to priority. Data-type information is allocated with higher priority than voice-type information, since voice-type information is less susceptible to loss of intelligibility upon the loss of a packet. The MUXBUS 90 is capable, under proper control, of routing information from more than one external trunk to a single network trunk to maximize utilization of trunk line spectrum. Up to a 4-to-1 trunk compression is contemplated.

The MUXBUS 90 is primarily a parallel data bus; serialized information is converted to parallel for exchange between cards connected to the MUXBUS 90. Unpacketized data is initially placed on the MUXBUS in circuit mode, thereafter it is packetized and in some instances compressed, then the data so processed reappears on the MUXBUS 90 as a packet in the packet mode which is conveyed across the MUXBUS 90 ultimately to a trunk transceiver 94 or 96. Control and signaling can also be sent over the MUXBUS, for example, packetized control signalling may be exchanged between PCCs 100 throughout the network 12.

Figure 4:
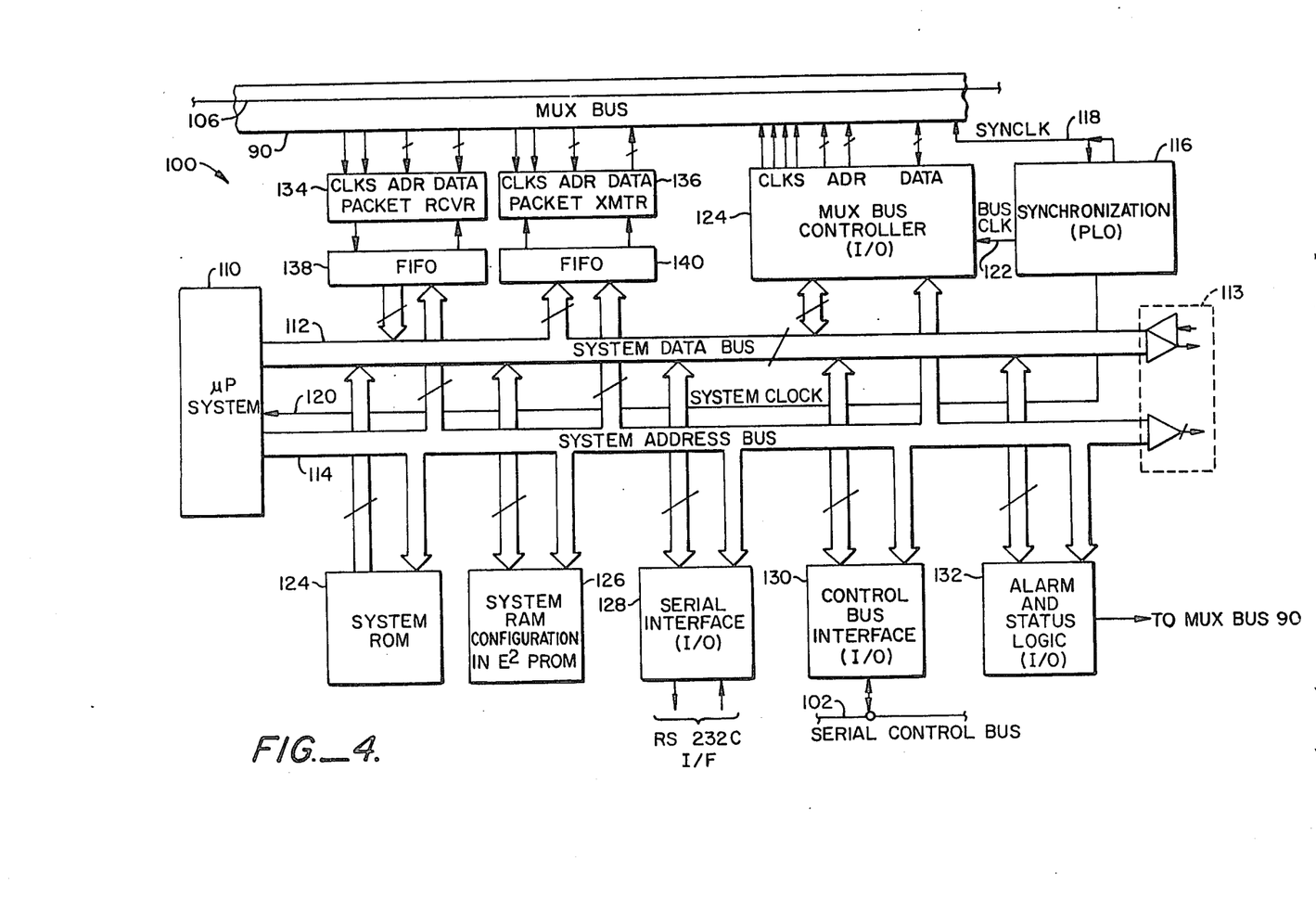
FIG. 4 is a block diagram of a packet control card or VDPS control subsystem employed in a VDPS.

With reference to FIG. 4, there is shown a detailed block diagram of a PCC 100 according to the invention coupled to a MUXBUS 90 in accordance with the invention. The PCC 100 is a small computer built around a microprocessor system 110. Associated with the microprocessor system 110 is a system data bus 112, a system address bus 114 (including control lines) and various other conventional structures accessible by system data and control buses. Timing is derived from a synchronization unit 116 coupled to an external master-sync clock through the MUXBUS 90. The synchronization unit 116 comprises a conventional phase-locked oscillator (not shown) with a crystal (not shown) for use in controlling the phase-locked oscillator in the case of external master clock disconnect or failure. The master clock is through a sync clock line 118 and is expected to provide a clock signal at 8.192 MHz derived from universal time. The synchronization unit provides to the microprocessor system 110 an 8.192 MHz clock via system clock line 120 via bus clock line 122. A bus clock line with a clock at 4.096 MHz is provided to a MUXBUS controller 124, the function of which will be explained hereinafter.

The synchronization unit 116 employs standard PCM synchronization technology. It compares T-1 trunk timing or generates internal crystal timing as necessary to bring the local system clock into synchronization with the universal clock.

The microprocessor system 110 is preferably built around a 16/32-bit microprocessor unit such as a member of the Motorola 68000 family. The microprocessor system 110 is configured to serve the purpose of address routing in accordance with the invention. The system 110 and elements associated with the system data bus and system address bus are designed to be self-contained in a processing environment. Hence, the operating system is preferably stored in a system ROM 124. Data is stored in a system RAM 126. The system RAM 126 may include electrically erasable programmable read-only memory to minimize volatility of data. A typical size of the system ROM 124 is 128K bytes. A typical system RAM 126 size is 64K bytes.

Various development operating systems are available for implementing dedicated functions for 68000 family micro-processors. Implementation of structures employing such a microprocessor system 110 involves relatively straightforward programming once the functions are defined. Therefore, it is not necessary to discuss in detail the operating system and the exact coding of the software to control the PCC 100 and related functions, since such functions would be a matter of engineering implementation. Nevertheless, it is to be recognized that the configuration and system specification represent defined contributions in accordance with the invention, since the structure of the packet communication system is defined by the specification.

Further elements in the PCC 100 are a serial interface 128, such as an RS-232C port a control bus interface 130 for I/O with the serial control bus 102 (FIG. 2), alarm and status logic interface 132 set up for input and output through the MUXBUS 90 (optionally) and first-in/first-out units 138 and 140 for controlling I/O functions on the MUXBUS. The units 138 and 140 for controlling I/O on the MUXBUS are coupled to a packet receiver 134 with clocks, address and data lines connected to the MUXBUS 90, or to a packet transmitter 136 with clocks, address and data bus coupled to the MUXBUS 90. The FIFO units 138 and 140 are standard parts containing a first-in/first-out memory and which is responsive to a read address command or a write address command. Packets addressed to the PCC 100 are received through the packet receiver 134. Packets originating with the PCC 100 are queued in the FIFO unit 140 and placed on the MUXBUS 90 through the packet transmitter 136.

A key element is the MUXBUS controller 124. While in a general-purpose central processor unit controllers are conventional digital logic devices, this MUXBUS controller 124 is a table-driven device responsive to present a particular preselected bit pattern and to generate a bus clock as hereinafter explained.

The PCC 100 provides the following functions: systems control, including interrupt control mechanisms and timing; generation of all clocks used on the MUXBUS 90, including a clock signal for synchronizing all trunk signals; generation of read and write addresses for the MUXBUS 90; arbitration control for the MUXBUS 90; error control (parity) for the MUXBUS 90; interface with a serial interface 128 (for a system manager); interface to a control bus 130 for non-packetized control functions in the VDPS 16; detection and generation of system status and alarms through an alarm and status logic unit 132; housekeeping control for maintaining trunk line integrity and for configuring the VDPS 16; and a packet interface to the MUXBUS 90 for controlled communication with controlled units remote from the VDPS 16, as for example, as generated by a remote system manager.

To maintain versatility in the PCC 100, an expansion port 113 is provided for extending the system data bus 112 and the system address bus 114. Such an expansion port would allow for the addition of other units for control, housekeeping and the addition of memory, or the like.

Figure 5:
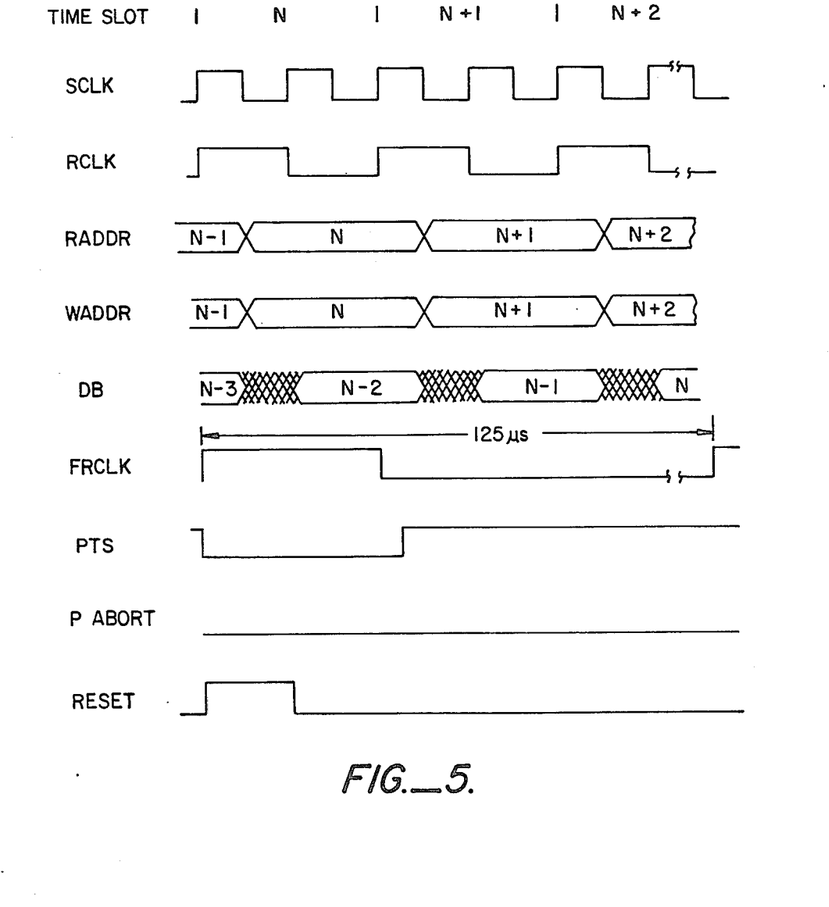
FIG. 5 is a timing diagram of a MUXBUS in accordance with the invention.

According to the invention, the MUXBUS controller 124 generates to the parallel MUXBUS 90 a sequence of pre-defined addresses and data words synchronously with a bus clock 122, each read address and write address being allocated once per time slot. In the particular embodiment, 12 parallel bits are provided for write address, 12 parallel bits are provided for read address and 1 bit defines time slot allocation of the MUXBUS between packet mode and circuit mode. The generation of a time slot qualifier bit on a time slot qualifier line 106 with a read address on parallel read address lines and a write address a parallel write address lines in synchronization with a bus clock implements packet switching according to the invention. In accordance with the preferred embodiment of the invention, 512 time slots are produced per 125 microsecond standardized frame duration. The function of the microprocessor 110 is primarily to set up an address table which defines the packet switch. The MUXBUS controller 124 is operative to clock the address table onto the MUXBUS 90. The MUXBUS 90 is set up to time share between circuit and packet time slots according to the setting of the time slot qualifier line 106. For example, if the time slot qualifier line 106 is in a high state, the MUXBUS 90 is allocated for packet time slots. If the time slot allocation line 106 is in a low state, the MUXBUS is allocated to circuit functions. FIG. 5 illustrates MUXBUS timing and signal relationships. The MUXBUS cycle is 244 nanoseconds, defining 512 MUXBUS time slots per 125 microsecond frame. Thus, the frame clock operates at 8 kHz.

In the preferred embodiment, the MUXBUS 90 comprises three parallel line groups, several types of clock lines and several types of control lines. In particular, the MUXBUS 90 includes a 12-bit read address line group, a 12-bit write address line group, an 8-bit data line group, a bus cycle clock line for a bus clock operating at 8.192 MHz, a data transfer clock line operating at 4.096 MHz, a frame clock line for a clock operating at 8 kHz in synchronization with the universal time clock for use in defining framing on the MUXBUS 90, a time slot qualifier line 106 for carrying a signal distinguishing between packet cycles and circuit cycles, a packet abort line for use by packet receivers coupled to the MUXBUS 90 to generate an abort signal indicating there is insufficient queue space available to receive a packet, and a reset line which is used to convey a signal to initialize or reset the circuitry. In connection with the MUXBUS 90 there is also a control bus which is a serial multi-access line used for direct communication among subsystems of the system. In a fully redundant system in which there is a backup MUXBUS, there is also a bus select line to define which MUXBUS is active.

FIG. 5 is a timing diagram for illustrating the operation of the MUXBUS 90. Read addresses and write addresses are written onto respective line group RADDR and WADDR each MUXBUS cycle at the first falling edge of the bus clock signal SCLK. Each subsystem on the bus latches the addresses on the next rising edge of the bus clock signal RCLK. One time slot following the latching of addresses, the subsystem addressed by the write address bus WADDR passes data onto the data line group (DB), generally at the rising edge of the delayed bus clock RCLK. Data is sampled and taken off the data bus at the end of the bus clock RCLK.

The packet control card 100, which controls the time slot qualifier line, may structure the time slot qualifier signal PTS arbitrarily. Hence, the time slot qualifier signal may be held in its packet state for as many bus cycles as is required to transfer all of the information in a packet.

Figure 6:
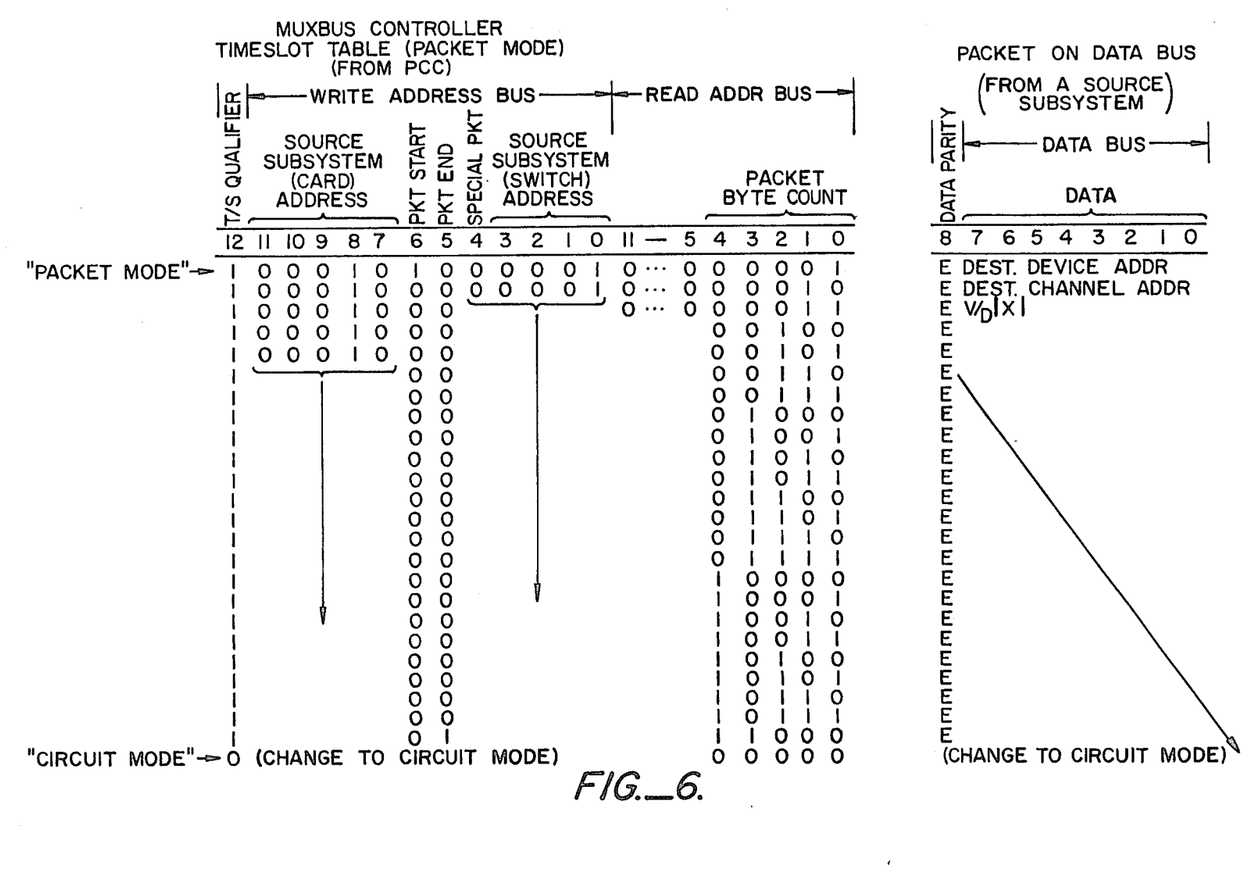
FIG. 6 is a table for illustrating the operation of a MUXBUS controller.

The write address includes all information indicating the address of the subsystem needed to send packet information onto the MUXBUS. A bit indicating that the current write address is at the beginning of the packet, and a bit indicating that the current write address is at the end of the packet. FIG. 6 illustrates a typical connection table stored in the MUXBUS controller 124 (FIG. 4) for packet mode operation. The connection table is stored typically in random access memory of the MUXBUS controller 124. The MUXBUS controller 124 is operative under clock control to increment through the connection table at bus clock speed, applying addresses and data to the MUXBUS 90. It is important to note that the address is generated by the MUXBUS controller 124 and that data packets are placed on the bus from the addressed or source subsystem. FIG. 6 illustrates the structure of the table relative to the time slot qualifier line, the write address line group or bus, the read address line group or bus and the data bus. In the write address bus is a table with 12 positions containing source address information for a packet carried by the data bus. In a specific embodiment, the address is constructed of 2 fields, a first field relating to a source subsystem address card address, and the second field relating to the source subsystem or switch address. The source subsystem switch is the address of a particular element on a card. One bit position in the connection table is reserved to designate packet start (Bit 6) and another bit position is reserved to designate packet end (Bit 5). All addresses between the packet-start bit and the packet-end bit in the packet mode, as designated by the time slot qualifier bit (Bit 12), define the address for one packet. Hence, the source subsystem card address and source subsystem switch address do not change between the packet start and the packet end.

The read address bus is employed in the packet mode to generate a packet byte count which is used by the other subsystems to index into their respective output and input packet FIFOs. Twenty-four increments of addresses in the time slot table define each packet. The MUXBUS controller 124 reexecutes the time slot table once per frame.

A MUXBUS packet is channeled in parallel bytes from data queues through the data bus portion of the MUXBUS. It is transferred in accordance with a destination device address and destination channel address of the MUXBUS controller. The destination device address and destination channel address are found in the first two 8-bit bytes of a packet on the MUXBUS 90, as shown in FIG. 6. The destination device address is the first byte, and the destination channel address is the second byte. The first bit of the third byte is a priority bit for distinguishing between voice packets and data packets. Voice packets are assigned low priority since transmission of a voice packet is less critical than that of a data packet. Data packets are given the high priority. The information of the packet conveyed between ultimate source and ultimate destination is contained in the fourth through the twenty-fourth time slot table of the data bus, following the beginning of each packet. Housekeeping signals reside in the position of the third byte normally used for the Hamming bits in the trunk frame packet (FIG. 3). Except for the first three bytes, the trunk frame packet of FIG. 3 and the MUXBUS packet shown in the data bus time slot table of FIG. 6 contain virtually the same information. The trunk frame packet has added a framing bit and employs Hamming bits for correction of the device address and channel address field. Since data correction is not necessary in the environment of the MUXBUS, the Hamming bits are unnecessary and are therefore stripped off when a MUXBUS packet is formed.

In operation, the MUXBUS controller time slot table is set up by the microprocessor system 110 by loading a random access memory with digital values representing packet mode, source subsystem card address, source subsystem switch address, packet start and packet end in a table of consecutive values. The table contains 512 positions. Twenty-four positions are grouped together for each packet during the packet mode. In the circuit mode, the table is set up with controller sequences for exchanging information within the MUXBUS environment only and for passing unpacketized information to or from a packetizer/depacketizer.

Figure 7:
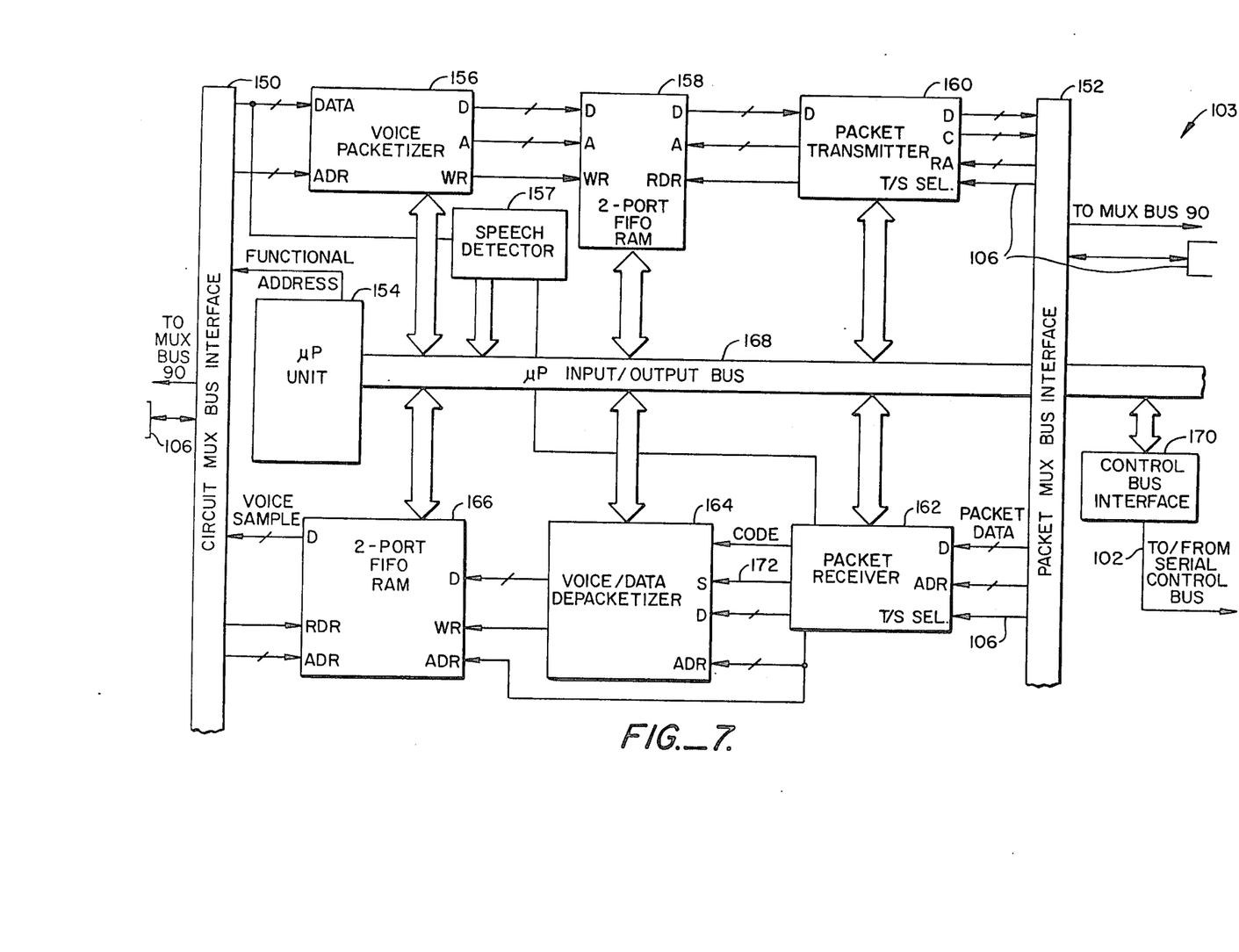
FIG. 7 is a block diagram of a voice compressor/decompressor subsystem in accordance with the invention.

Referring to FIG. 7, there is shown the VDP 103 (FIG. 2) in greater detail. The VDP 103 includes two interfaces: a circuit MUXBUS interface 150 and a packet MUXBUS interface 152. The packet MUXBUS interface 152 communicates with the MUXBUS 90 when the MUXBUS 90 is in the packet mode. The circuit MUXBUS interface 150 connects with the MUXBUS 90 when the MUXBUS 90 is in the circuit mode. Packet versus circuit control of the MUXBUS 90 is according to time slot as indicated by the state of time slot qualifier line 106.

On the packet MUXBUS interface 152, communication is in the packet format according to the invention. On the circuit MUXBUS interface 150, communication is according to conventional time-division multiplexed pulse-code modulation format, except at TTL levels. The purpose of the VDP 103 is to packetize and to depacketize voice information in accordance with published ADPCM (adaptive, digital pulse-code modulation) data compression standards. The VDP 103 is a semiautonomous subsystem in that it includes its own microprocessor unit 154 to control all VDP subsystem functions.

The VDP 103 consists of two data paths, the first data path comprising a voice packetizer 156 coupled to receive signals from the circuit MUXBUS interface 150 and to supply packetized signals as output to the packet MUXBUS interface 152. The voice packetizer 156 is coupled to provide data and address information to a two-port first-in, first-out random access memory (2-port FIFO RAM) 158. The data output is coupled to a packet transmitter 160 which in turn is coupled to the packet MUXBUS interface 152. The packet transmitter 160 accesses data in the RAM 158 through the packet time slot access as herein explained.

The packet-to-circuit signal path comprises a packet receiver 162, a voice/data depacketizer 164, and a 2-port FIFO RAM 166.

The microprocessor unit 154 consists of a CPU with RAM, ROM and other support subsystems (not shown) required to provide a microcontroller capable of supporting self-test and diagnostics, voice packet scheduling, channel load monitoring, first-in, first-out control, and any needed configuration adjustments generated under external control, such as through the packet control card. The microprocessor unit 154 is coupled through a microprocessor input/output bus 168 to each of the other units, and it may be coupled through a control bus interface 170 to the serial control bus 102 (FIG. 2), through which information can be exchanged for configuration adjustment. In a typical system, generalized functions are stored in a read-only memory (not shown) such that only data needs to be provided to operate the system in accordance with the invention.

In operation, the voice/data packetizer 156 receives PCM voice data from the circuit MUXBUS interface 150 at a data port. If the PCM data is a voice sample, the sample is compressed according to the ADPCM Conversion standard. If the PCM sample is not a voice sample, it does not go through this conversion process. The samples are then stored in the 2-port FIFO RAM 158. In one embodiment of the voice packetizer, elements are conventional random-logic circuit elements responsive to address information from the circuit MUXBUS interface and to configuration information from the microprocessor input/output bus 168 in order to packetize the voice samples according to the ADPCM standard. The voice depacketizer 164 performs the inverse functions to the voice packetizer/data 156, that is, it converts the packetized samples back to sequential channelized PCM data, storing them into the 2-port FIFO RAM 166. If the received packet contains compressed voice samples, each sample is first decompressed according to the ADPCM conversion sample prior to being stored in the FIFO RAM 166. The incoming samples are also scanned by a speech detector 157. This speech detector 157 implements standard algorithms for detecting speech. If speech is present, the microprocessor unit 154 will schedule speech packets for transmission, via Packet Transmitter 160. Data packets are always transmitted. In operation, the speech detector 157 integrates the energy in the speech and compares it against two thresholds. If packets are incoming via line 159, the integrated speech energy is compared against a high threshold. If no packets are incoming, the integrated speech energy is compared against a lower threshold. If the threshold is exceeded in either case, a signal is sent to the microprocessor unit 154. The two threshold technique is used to prevent echoed voice signals from tripping the speech detector 157. In addition, the speech detector 157 counts zero-crossings of the incoming circuit speech samples. If the number of zero-crossings exceeds a threshold during a particular time interval, the speech sample is classified as "tone date". The microprocessor unit may then increase the priority of the particular channel's packets. This is included to improve the performance of voice-band data modem channels.

The 2-port FIFO RAMs 166 and 158 are standard 2-port memory devices, namely, a recirculating random access memory with a read-port and a write-port. The RAMs 158 and 156 are used for temporary storage of the digitized information before transfer to receiving subsystems. The microprocessor unit 154 may read and write to any of the locations either of the RAMs 158 or 156 for diagnostic purposes.

The 2-port FIFO RAM 166 includes a sufficiently large per-channel circular FIFO queue for temporary storage of the PCM voice samples so that the circuit MUXBUS interface can read the samples from the queue for each voice sample synchronously at a rate of 125 microseconds. The voice depacketizer 164 loads the FIFO RAM 166 whenever a new packet arrives. In the absence of a packet, silence codes are sent.

The packet transmitter 160 manages the high-speed packet FIFO RAM 158. The packet transmitter responds to the microprocessor unit 154 to provide instructions to the FIFO RAM 158 to indicate when a block of a voice packet is to be sent.

The packet receiver 162 receives the packet data from the packet MUXBUS interface 152 during the period when the time slot selector line 106 has established that the packet portion of the bus is active. The packet receiver 162 may contain two high-speed FIFOs which are used to receive voice packets from the MUXBUS 90. The packet receiver is structured so that an arriving packet is first checked for validity using the parity error bit. An invalid address will cause a packet to be discarded. A valid address will be compared against a RAM address previously loaded by the microprocessor unit 154, indicating what address is to be expected, in order to determine whether this packet is to be kept or discarded. If a packet is to be kept, the packet is sent on to the voice/data depacketizer 164. The same address is applied to both the voice/data depacketizer and the 2-port FIFO RAM 166. The packet receiver 162 signals the voice depacketizer 164 through a select line 172 as to which packet is to be processed.

Figure 8:
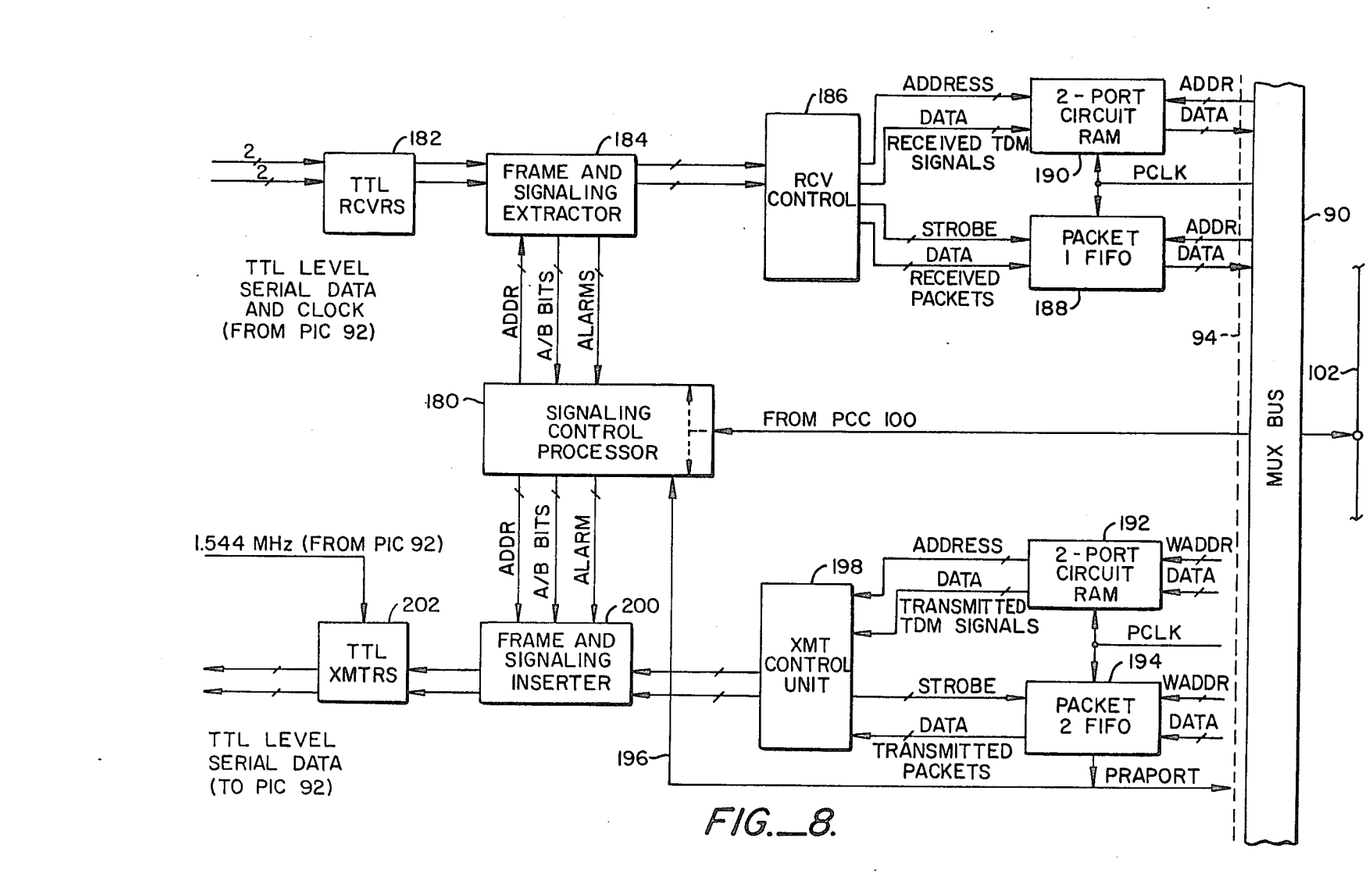
FIG. 8 is a block diagram of a four channel transceiver for T-1 type applications for use in a VDPS according to the invention.

FIG. 8 illustrates a channel trunk transceiver 94 according to the invention (FIG. 2). As many such transceivers as are required may be coupled between the MUXBUS 90 and a trunk interface (FIG. 2). The MUXBUS 90 is shown for clarity, together with the control bus 102. The transceiver 94 employs a signaling control processor 180. The signaling control processor 180 is typically a microprocessor-based unit including logic for driving addresses and data buses within the subsystem, as well as interrupt control logic, timers and address decoding logic. The exact details of the signaling control processor are matters of engineering choice within the capabilities of those skilled in the art. The primary function is to control frame signaling and extraction and to provide frame signaling and insertion in an exchange of TTL level signals with the protection interface card 92, which in turn is connected to the standardized T-1 trunk lines. The control bus 102 primarily provides configuration signals from a central system controller which shares the MUXBUS 90, such as the packet control card 100.

The transceiver 94 includes TTL-level receivers 182 coupled to receive serial data and clock signals at TTL levels from the PIC 92. The TTL receivers 182 drive a frame and signaling extractor 184. Alarm signals may be generated from the extractor 184 to provide a visual indication of alarm status of the system developed from conventional analysis of the trunk signals. The frame and signaling extractor 184 is conventional trunk system technology. One of the trunk lines is in standard PCM DS-1 format while other trunk lines may use the packet format in accordance with the invention. Therefore, the extractor 184 is also operative to provide packet information to a receiver control unit 186. The receiver control unit 186 is a time division controller which is operative to route information which is in packet format to a receiver packet FIFO 188 or to route information which is in conventional time division multiplex format to a receiver two-port circuit random access memory (circuit RAM) 190. The receiver circuit RAM 190 stores the TDM signals for retrieval through the MUXBUS 90 as data during circuit mode operation. The receiver packet FIFO 188 is used for temporary storage of packets to be transmitted onto the MUXBUS 90. Access to the information contained in the receiver packet FIFO 188 is in accordance with the protocol established for packet communication on the MUXBUS 90, as described hereinabove. In other words, the transceiver 94 and the circuit RAM 190 are identifiable by a preselected read address. Whenever the specified read address is applied to the MUX bus 90, data corresponding to the address is accessed and made available through the MUXBUS 90 to another unit coupled to the MUXBUS 90.

A two-port transmitter circuit RAM 192 is provided to receive data from the MUXBUS during circuit switching mode operation. When the address of the transmitter two-port circuit RAM 192 is active at the same time the read address of the receiver two-port circuit RAM 190 is active, TDM signals are looped through the transceiver 94. Similarly, a transmitter packet FIFO 194 is provided to receive data from the MUXBUS 90. When the write address of the transmitter packet FIFO 194 is active at the same time the read address of the receiver packet FIFO 188 is active, packet data is recirculated through the transceiver between trunk line ports.

If the FIFO 194 is full and cannot accept any more packets, it signals this condition to the MUXBUS, as well as the signalling control processor 180 via PKA-BORT line 196. The number of times this control line is activated is monitored by signalling control processor 180 and the PCC to determine if the system is overloaded. The transmitter circuit RAM 192 and the transmitter packet FIFO 194 are coupled to a transmit control unit 198 through which either transmitted TDM signals or transmitted packets are routed to a frame and signaling inserter 200. The frame and signaling inserter 200 inserts the DS-1 framing signals into the TDM signals or into the packets in accordance with conventional trunk system technology. In DS-1-transmission practice certain combinations of bits are not expected to occur. In particular, no more than 15 zeros in a row may be transmitted. The packet trunk lines are protected from this problem by insuring that no packet contains more than 15 consecutive zero bits. The packet creators (i.e., VDP and PCC) are responsible for insuring this.

The inserter 200 is then operative to route output to TTL transmitters 202. The TTL transmitters 202 generate serial data at TTL levels for conversion by the protection interface card (PIC) 92.

The TTL level signals from the TTL transmitters 202 are directed to the protection interface card 92. A clock signal is provided from the packet control card 100 at the standard framing pulse rate.

FIG. 9 illustrates the elements of the protection interface card (PIC) 92. The function of the protection interface card 92 is to couple internal digital signals at TTL levels to external digital trunk lines, for example, T-1 trunk lines. The protection interface card 92 is readily assembled from conventional elements. It comprises standard T-1 transceivers with signal protection. DS-1 signals are brought in through standard T-1 interfaces through relays, for example in banks of eight bipolar signals. The bipolar signals are converted to TTL signals in a standard bipolar-to-TTL converter array 210. TTL signals are provided to a space switch 212. The space switch 212 is responsible for routing the TTL signals to the appropriate transceiver card (TXR) 94 (FIG. 8). Incoming DS-1 signals are employed to generate the master synchronization signal. A master sync unit 214, typically comprising a phase-locked oscillator and crystal, derives the universal time clock signal from the DS-1 signal to generate a sync signal. The sync signal is supplied to the MUXBUS 90 through the sync line 98 (also FIG. 2). Signals from the TXR 94 are applied to a transmitter space switch 216. It should be understood that more than one transceiver may be connected to the protection interface card 92, since the line receivers can support more than one set of signals. An array of standard TTL-to-bipolar converters 218 receives output of the transmitter space switch 216. The converter 218 convert the TTL-level signals to bipolar signals and in turn supply the signals to the T-1 cables in DS-1 format outputs through signal relays, such as signal relays 220. In a similar manner the signal relays 209 receive DS-1 signals from T-1 cables. Signal relays 223 may be provided also to couple bipolar signals between input signal relays 209 and output signal relays 220, in accordance with conventional engineering practice in order to loop back the system for diagnostics.

The protection interface card 92 includes a microprocessor-based controller 222 with associated memory 224 and I/O 226. The I/O 226 connects to relays 223, converters 210 and 218 and status/alarm indicators and relays 225. The microprocessor 222 communicates with its memory and I/O as well as to a control bus interface 228 through an internal processor bus 230 of conventional design. The control bus interface 228 provides the interface between the microprocessor 22 and the control bus 102.

Each of the subsystems of the invention is self-contained and consists of all functional units necessary to operate in its environment in cooperation with other units intended to connect with a MUXBUS-based system. The modular design allows for new structures to be incorporated for particular configurations. The system could be used as a relay station in a trunk environment, as an interface with a PBX system, or as interface with a large number of PBX systems. The capacity of the system is limited only by the address base of a MUXBUS. In extremely dense environments, means may be provided for a parallel MUXBUS so that system capacity can be enhanced.

The invention has been explained with reference to specific embodiments. Other embodiments will be apparent to those of ordinary skill in the art. It is therefore not intended that this invention be limited, except as indicated by the appended claims.

We claim:

1. A communications network for communicating digitized voice and data in separate and distinct packets, said network comprising;
   a digital communications medium having at least a first node and a second node, said digital communications medium being operative to communicate standardized sychronous digital time frames of information according to a standardized communications format; and
   means for coupling digital signals to said digital communications medium at said first node, said coupling means including means for packetizing signals into digitized information format, each said digitized information packet having a packet format which is self-contained as to destination and content and which conforms to boundaries to said standardized synchronous digital time frames, wherein said packetizing means is also operative further to compress voice signals according to digital speech interpolation (DSI) techniques and to encode said voice signals for use in a voice data rate compression means using adaptive differential pulse code modulation (ADPCM) techniques, such that said packets are communicated from said first node to said second node synchronously with reference to said communications medium within said standardized communications format.

2. The network according to claim 1 wherein said voice packets are dropped in the event of over capacity operation of said digital communications medium.

3. The network according to claim 1 wherein said digital communications medium is a telephone digital trunk, commonly called a T-1 line.

4. The network according to claim 1 wherein said digital communications medium is a cable TV system capable of carrying signals according to said standardized communication format within a conventional video channel.

5. A communications network for communicating digitized voice and data in separate and distinct packets, said network comprising:
   a digital communications medium having at least a first node and a second node, said digital communications medium being operative to communicate standard synchronous digital time frames of information according to a standardized synchronous communications format; and
   means for coupling digital signals to said digital communications medium at said first node, said coupling means including means for packetizing signals into digitized information packets, each said digitized information packet having a packet format which is self-contained as to destination and content and which conforms to boundaries of said standardized synchronous digital time frames such that packets are communicated from said first said node to said second node synchronously with reference to said communications medium within said standardized communications format wherein said packetizing means is also operative further to compress voice signals according to digital speech interpolation (DSI) techniques and to encode said voice signals in a voice data rate compression means using adaptive differential pulse code modulation (ADPCM) techinques.

6. The network according to claim 5 wherein said voice packets are dropped in the event of over capacity operation of said digital communications medium.

* * * * *